United States Patent
Logiudice et al.

(10) Patent No.: US 8,278,840 B2
(45) Date of Patent: Oct. 2, 2012

(54) SIGMA DELTA CURRENT SOURCE AND LED DRIVER

(75) Inventors: Andrea Logiudice, Padova (IT); Giorgio Chiozzi, Padova (IT)

(73) Assignee: Infineon Technologies Austria AG, Villach (AT)

( * ) Notice: Subject to any disclaimer, the term of this patent is extended or adjusted under 35 U.S.C. 154(b) by 267 days.

(21) Appl. No.: 12/719,655

(22) Filed: Mar. 8, 2010

(65) Prior Publication Data

US 2010/0231132 A1 Sep. 16, 2010

(30) Foreign Application Priority Data

Mar. 12, 2009 (EP) ..................................... 09155019

(51) Int. Cl.
*G05F 1/00* (2006.01)

(52) U.S. Cl. ........ 315/294; 315/291; 315/307; 315/312; 315/193; 341/143; 341/77; 341/52; 345/46; 345/83; 345/77

(58) Field of Classification Search ................... 315/192, 315/193, 185 R, 302, 307, 308, 291, 312, 315/224, 169.1–169.3, 294; 341/52, 57, 341/64, 77, 136, 143; 345/46, 82, 93, 102, 345/690, 83, 77
See application file for complete search history.

(56) References Cited

U.S. PATENT DOCUMENTS

| | | | |
|---|---|---|---|
| 5,803,579 A * | 9/1998 | Turnbull et al. .............. | 362/516 |
| 6,016,038 A | 1/2000 | Mueller et al. | |
| 6,150,774 A | 11/2000 | Mueller et al. | |
| 6,414,661 B1 * | 7/2002 | Shen et al. ....................... | 345/82 |
| 6,573,666 B1 | 6/2003 | Killat | |
| 7,173,384 B2 * | 2/2007 | Plotz et al. ..................... | 315/291 |
| 7,649,326 B2 * | 1/2010 | Johnson et al. ................ | 315/291 |
| 7,667,408 B2 * | 2/2010 | Melanson et al. ......... | 315/209 R |
| 7,915,838 B2 * | 3/2011 | VanEss .......................... | 315/302 |
| 2008/0007497 A1 | 1/2008 | Pauritsch | |
| 2008/0111503 A1 | 5/2008 | Ess et al. | |
| 2009/0309502 A1 | 12/2009 | Trattler | |

FOREIGN PATENT DOCUMENTS

| | | |
|---|---|---|
| DE | 103 57 776 A1 | 7/2005 |
| DE | 10 2006 032 071 A1 | 1/2008 |
| EP | 1 528 841 A2 | 5/2005 |
| EP | 2 081 414 A1 | 7/2009 |
| WO | WO-2008/000465 A1 | 1/2008 |
| WO | WO-2008/006450 A1 | 1/2008 |

OTHER PUBLICATIONS

Ruskowski, M., "Aufbau und Regelung aktiver Magnetführungen," Dissertation of Martin Ruskowski, Nov. 1969, pp. 37, picture 3.12, Hannover, Germany.

* cited by examiner

*Primary Examiner* — Haiss Philogene
(74) *Attorney, Agent, or Firm* — Slater & Matsil, L.L.P.

(57) ABSTRACT

A circuit arrangement includes a first light emitting diode and a second light emitting diode emitting light of different colors arranged adjacent to each other for additive color mixing. A first and second controllable current sources are connected to the first and second light emitting diode, respectively, such that the load currents of the light emitting diodes depend on respective control signals received by the current sources. First and second sigma-delta modulators are connected to the first and second light emitting diodes, respectively, and provide bit-streams as control signals to the current sources. The mean value of each bit-stream corresponds to the value of an input signal of the respective sigma-delta modulator.

17 Claims, 7 Drawing Sheets

SIGMA DELTA CURRENT SOURCE AND LED DRIVER

This application claims priority to European Patent Application 09155019, which was filed Mar. 12, 2009 and is incorporated herein by reference.

TECHNICAL FIELD

The invention relates to the field of driver circuits for light emitting diodes (LEDs), especially multi-color light emitting diodes.

BACKGROUND

The brightness of light emitting diodes (LEDs) is directly dependent on the load current flowing through the diode. To vary the brightness of an LED it is known to use a controllable current source that is set to a current representing a desired brightness. In digitally controlled applications a digital-to-analog converter (DAC) may be used to set the current of the controllable current source.

Since the human eye cannot resolve high frequency brightness fluctuations of approximately 100 hertz or higher, it is known to supply the LED with a pulse width modulated current of sufficient frequency. In this case the human eye low-pass filters the resulting pulse width modulated brightness of the LED, i.e. the eye can only sense a mean brightness that depends on the mean LED current which is proportional to the duty cycle of the pulse width modulation. Consequently only the mean current through an LED is relevant to the brightness perceived by the human eye.

It is known to combine light of different colors (e.g. red, green, and blue) each having variable brightness to generate nearly any color sensation in the visible spectrum of light. In modern illumination systems or displays a combination of at least three LEDs of different colors are used to provide a multi-color illumination. The LED-triples may be arranged in a matrix like structure thus forming a display where each "pixel" of the display is represented by an LED-triple typically including a red, a green, and a blue LED. To vary the color of a pixel the brightness of the different LEDs has to be individually adjustable. Each of the three LEDs may therefore be driven by a pulse-width modulated current signal of a sufficient high frequency, for example, 400 hertz.

However, the resolution requirements are quite high for modern illumination systems or displays. That is, the brightness of a single LED should be adjustable to at least 4096 different brightness values which corresponds to a brightness resolution of 12 Bit. When using pulse width modulation for controlling the brightness, a time resolution of approximately 600 nanoseconds has to be provided in order to be able to resolve a PWM period of, for example, 2.5 milliseconds (corresponds to 400 hertz) with 12 bits. This entails the need for very fast switching currents with all the known problems that can occur. Particularly, the electromagnetic compatibility (EMC) is low when switching currents with rise and fall times in the sub-microsecond range.

Driving the LEDs with a continuous current whose value is controlled by a DAC is also not satisfying since the wavelength of the color of a single LED may vary over the LED current. This entails a very complex brightness control in multi-color LED systems since the color has to be corrected when changing the brightness of a three LED pixel.

There is a need for an alternative concept for driving LEDs and multi-color LED-arrangements, particularly improving the electromagnetic compatibility compared to PWM driven LED systems.

SUMMARY OF THE INVENTION

A circuit arrangement is disclosed. The arrangement includes a first light emitting diode and a second light emitting diode emitting light of different colors arranged adjacent to each other for additive color mixing. A first and a second controllable current source are connected to the first and a second light emitting diode, respectively, such that the load currents of the light emitting diodes depend on respective control signals received by the current sources. A first and a second sigma-delta modulator are connected to the first and the second light emitting diode, respectively, and provide bit-streams as control signals to the current sources, whereby the mean value of each bit-stream corresponds to the value of an input signal of the respective sigma-delta modulator.

BRIEF DESCRIPTION OF THE DRAWINGS

The invention can be better understood with reference to the following drawings and description. The components in the figures are not necessarily to scale, instead emphasis being placed upon illustrating the principles of the invention. Moreover, in the figures, like reference numerals designate corresponding parts. In the drawings:

FIG. 7b is a block diagram of a circuit arrangement which is an alternative to the arrangement of FIG. 7a;

DETAILED DESCRIPTION OF ILLUSTRATIVE EMBODIMENTS

Figure 1:
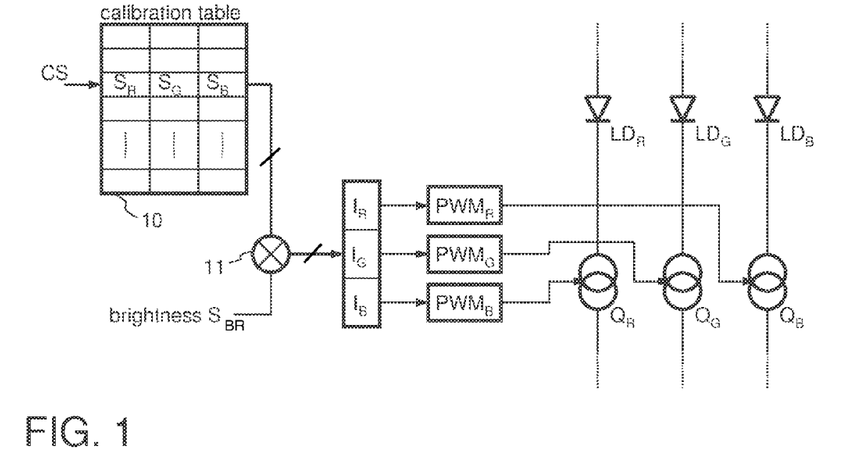
FIG. 1 is a block diagram of an LED driver circuit for driving multi-color LEDs.

FIG. 1 illustrates an LED driver circuit for driving an LED triple, where each LED, LD, has a different color (as indicated by the subscript). Such LED triples can be, if adequately controlled, used for generating any color of the visible spectrum by means of additive mixture of colors. For this purpose a red LED $LD_R$, a green LED $LD_G$, and a blue LED $LD_B$ are used. However, depending on the application, two different LEDs of different colors may be sufficient for color mixing. For controlling the brightness of each LED $LD_R$, $LD_G$, $LD_B$, each LED is connected in series to a respective controllable (in the present example switchable) current source $Q_R$, $Q_G$, and $Q_B$. If, for example, yellow light is to be generated, then the load current through the red LED $LD_R$ has to be zero and the load currents through the green LED $LD_G$ and the red LED $LD_R$ have to be approximately equal, where the absolute current value depends on the desired brightness of the yellow light.

However, the wavelength of the light emitted by the LEDs will vary dependent on the load current passing through the LEDs. This dependency entails a change in hue when changing the load current for adjusting the brightness value. To avoid this effect switchable current sources $Q_R$, $Q_G$, $Q_B$ may be used whereby each is controlled by a pulse width modulated (PWM) control signal. The hue of the LEDs does not change since the brightness value is not adjusted by continuously adjusting the load currents but by adjusting the duty cycle of the PWM control signal. The "averaging" of the PWM signal is performed by the human eye.

In the driver circuit of FIG. 1 the hue is selected by a pointer CS that identifies an entry of a calibration table 10 where the corresponding load current values $S_R$, $S_G$, $S_B$ for the three LEDs are stored. The stored values $S_R$, $S_G$, $S_B$ are calibrated for maximum brightness and are multiplied (multiplier 11) with a brightness value $S_{BR}$ for a reduced brightness. The resulting desired average current values $I_R=S_R S_{BR}$, $I_G=S_G S_{BR}$, $I_B=S_B S_{BR}$ are fed to the pulse width modulators $PWM_R$, $PWM_G$, $PWM_B$ that generate a respective PWM control signal having the desired mean value for driving the LEDs.

In digitally controlled systems the desired average current values $I_R$, $I_G$, $I_B$ are typically provided as 12 bit words. The repetition frequency of the PWM pulses is typically 400 Hz which is high enough that the human eye does not sense any flickering. However, PWM frequencies ranging from 100 Hz to 600 Hz are commonly used for this purpose. As already discussed above a very fast switching of the load currents is necessary for providing the desired 12 bit resolution which entails, for example, EMC problems.

Figure 2:
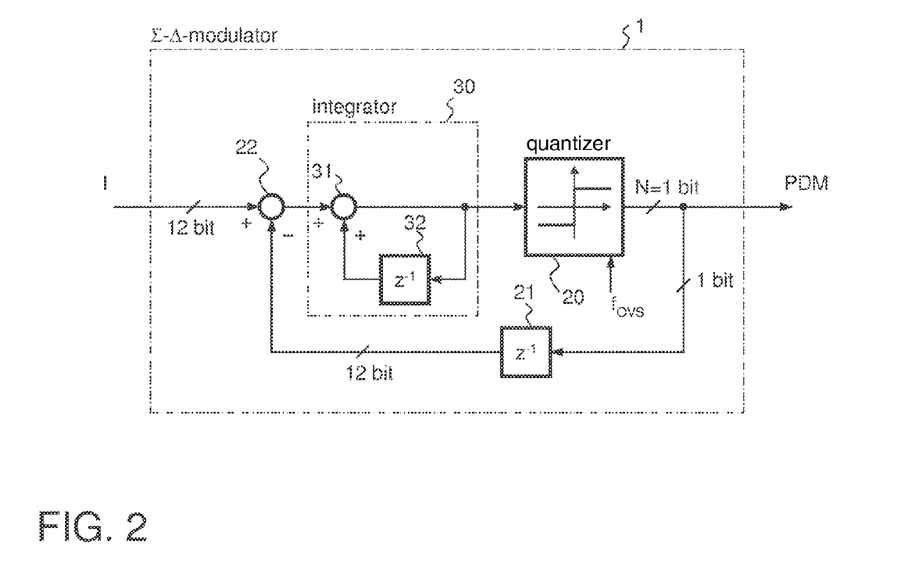
FIG. 2 is a block diagram of a digital sigma-delta modulator providing a pulse-density modulated output signal.

FIG. 2 illustrates a sigma-delta modulator 1 (Σ-Δ modulator, often also denoted as delta-sigma modulator) for providing a pulse density modulated signal PDM for driving each LED LD, through the corresponding current source Q. A pulse density modulated signal is generally a non periodic bit-stream with an average value corresponding to the input signal, i.e., the desired average load current I in the present example. In the present example the input signal I is a sequence of 12 bit words. The bit-stream is a sequence of equally spaced bits, i.e., a high level represents a binary "1" and a low level a binary "0". The density of "1"-bits in the pulse density modulated signal is high if the level of the input signal of the sigma-delta modulator is high. However, the length of one bit symbol ("1" or "0") is always the same and is equal to the period of the bit-rate frequency. For example, at a bit-rate of 40 kHz, the length of a bit symbol is 25 μs.

The sigma-delta modulator 1 includes a forward path comprising an integrator 30 and a quantizer 20. It further includes a feedback path including a delay element 21. The delay element 21 receives the 1-bit output signal PDM[k] of the quantizer 20 and provides the signal at its output delayed by a sample and as a 12 bit word, i.e., the bit value of the 1-bit input signal of the delay element 21 is copied to the most significant bit of the respective output signal. "k" thereby is a time index. The delayed output signal PDM[k−1] is subtracted (subtractor 22) from the input signal I[k] and the resulting difference I[k]−PDM[k−1] is supplied to the integrator 30 that has its output connected to the quantizer 20.

In the present example the integrator 30 is a standard first-order digital integrator with a delay element 32 in a feedback path and an adder 31. The transfer function of the integrator in the z-domain is $1/(1-z^{-1})$. However higher order integrators may also be applied. The quantizer 20 may be a simple comparator element. In the present example the quantizer provides the most significant bit of its 12-bit input signal value at its output. However, multi-bit quantizer 20 are also applicable for providing an N-bit output PDM signal which is a stream of N-bit words, i.e., a set of N "parallel" bit-streams. For example, at each sampling time a 3-bit quantizer quantizes the value of its input signal to one of eight discrete output values, namely "000", "001", "010", . . . , "110", "111" (or 0, . . . , 7 in decimal numbers), i.e., the 3-bit quantizer provides a stream of 3 bit words.

For proper operation of the sigma-delta modulator 1 the input signal has to be strongly over-sampled. Then the quantization noise is "shifted" towards higher frequencies and can therefore be removed by a simple low-pass filtering which is, in the present case, advantageously performed by the human eye. The noise shaping properties of sigma delta modulators are well known and not further discussed here. For a bandwidth of the input signal $I_R$ of 400 Hz an over-sampling frequency of 40 kHz is sufficient to provide a signal-to-noise ratio ($SNR_{dB}$) of at least 74 dB which corresponds to an effective resolution of 12 bits. The effective number of bits (ENOB) may be calculated as:

$$ENOB=(SNR_{dB}-1.76)/6.02, \qquad (1)$$

whereby the signal-to-noise ratio $SNR_{dB}$ may be calculated as:

$$SNR_{dB}=6.02N+1.76-5.17+30 \log_{10}(OSR) \qquad (2)$$

for a sigma-delta modulator 1 with a first order integrator 30, an over-sampling rate OSR (ratio of sampling rate and bandwidth) and a N-bit quantizer 20 (N=1 in the present example). For a sigma-delta modulator 1 with a second order integrator 30 the signal-to-noise ratio $SNR_{dB}$ is given by:

$$SNR_{dB}=6.02N+1.76-12.9+50 \log_{10}(OSR). \qquad (3)$$

From the discussion above it can be seen, that at a given resolution, for example, 12 bit, and moderate frequencies of about 40 kHz a sigma-delta modulator provides a pulse-density modulated output signal, i.e., a bit stream, which may be used for controlling the current sources $Q_R$, $Q_G$, $Q_B$ connected to the LEDs $LD_R$, $LD_G$, $LD_B$ in an LED driver circuit such as the circuit of FIG. 1.

For stable operation within the desired resolution the sigma-delta modulator may include an anti-aliasing filter for limiting the bandwidth of its input signal to a predefined bandwidth of, for example, 400 Hz.

Compared to the circuit of FIG. 1, which uses PWM modulators for driving the LEDs, the rise and fall times of the switching can be much longer when using a sigma-delta modulator instead, since the bit-stream comes at relatively low frequencies of about 40 kHz. Longer rise and fall times entail less electromagnetic interferences (EMI) and a better electromagnetic compatibility (EMC).

An alternative implementation of the sigma-delta-modulator of FIG. 2 is shown further below in FIG. 11 (see modulator 1 in FIG. 11).

Figure 3:
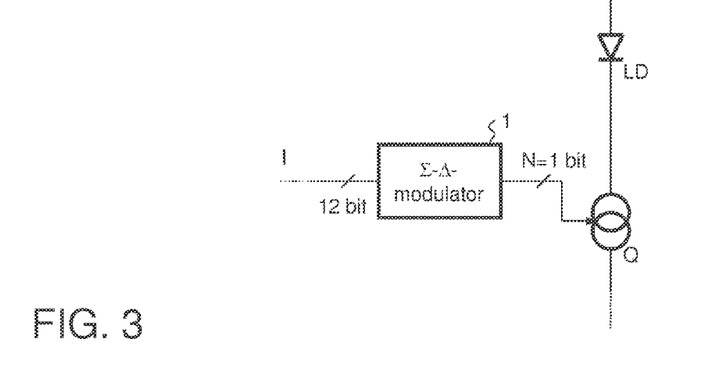
FIG. 3 is a block diagram of an LED driver circuit including the sigma-delta modulator of FIG. 2.

FIG. 3 shows the application of the sigma-delta modulator 1 of FIG. 2 in an LED driver circuit. Only one LED LD connected in series to one current source Q is depicted in FIG. 3. However, the circuit of FIG. 3 may be tripled to form a driver circuit for three LEDs $LD_R$, $LD_G$, $LD_B$ of different colors analogously to the circuit of FIG. 1. The sigma-delta modulator 1 receives a desired average current value I and provides a corresponding pulse bit-stream which is a pulse-density modulated control signal supplied to the switchable current source Q. The input I of the sigma-delta modulator 1 may be derived from a calibration table analogously to the circuit of FIG. 1.

Figure 4:
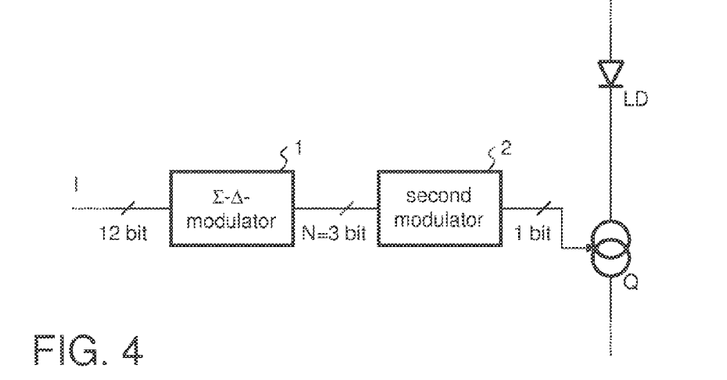
FIG. 4 is a block diagram of an LED driver circuit including a sigma-delta modulator followed by a second modulator.

FIG. 4 illustrates another example of how to apply a sigma delta modulator 1 in an LED driver circuit. This example is especially useful when using a sigma-delta modulator 1 with a multi-bit quantizer 20, e.g., a 3-bit quantizer or a 3-bit analog-to-digital converter. In this exemplary case the quantizer (see reference symbol 20 in FIG. 2) does not only distinguish between two discrete values "0" and "1" but between eight discrete values "000", "001", "010", "011", "100", "101", "110", and "111", i.e. "0" to "7" in the decimal numbers. The sigma-delta modulator 1 therefore does not provide a single bit output signal PDM but a stream of 3-bit words, i.e., three parallel bit-streams representing a stream of numbers 0 to 7. For transforming this three bit-streams into one control signal for driving the current source Q a second modulator 2 may be employed, for example, a pulse-width modulator (PWM) or a pulse frequency modulator (PFM). In the present example a PWM is used as second modulator 2. In contrast to the example of FIG. 1 the PWM needs only to resolve 8 different positions (3 Bits) in time during the PWM period of, for example, 25 μs (i.e., the sampling time of the sigma-delta-modulator). As a consequence the steepness of the switching edges may be lower by a factor of five due to the sigma-delta modulator 1 arranged upstream to the sigma delta modulator while maintaining or even increasing the resolution. Alternatively a 3-bit digital-to-analog converter may be used as second modulator 2. In this case the sigma-delta modulator 1 arranged upstream to the digital-to-analog converter (DAC) has the advantage that a low resolution DAC is sufficient. Compared to the circuit of FIG. 3 the present example allows for even slower switching frequencies which may be advantageous in case the connection between the LED and the driver circuit includes long cables. Furthermore switching losses are lower.

Figure 5:
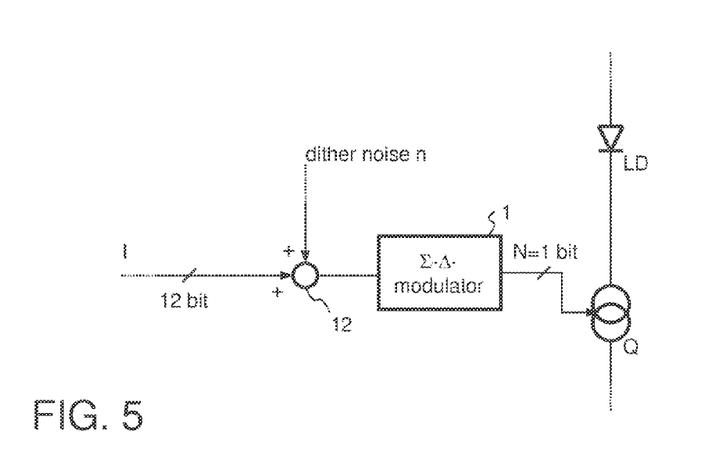
FIG. 5 is a block diagram of an LED driver circuit corresponding to FIG. 3 but with a dither noise added to the input for preventing limit cycles.

When modulating a constant input signal I, the pulse density modulated output signal of the sigma-delta modulator 1 (bit-stream) may exhibit some periodicity. This undesired effect is due to limit cycles and the spectrum of the bit-stream has so-called idle-tones, i.e., peaks at certain discrete frequencies. To avoid the idle tones a low power noise signal n[k] having zero mean and, for example, a triangular or a rectangular probability density function may be added to the input signal I as depicted in FIG. 5 by means of an adder 12. This technique is also referred to as "dithering". Due to the noise-shaping properties of sigma-delta modulators 1 the power is of the dither noise n[k] is "shifted" towards higher frequencies that cannot be resolved by the human eye. That is, the human eye performs a low-pass filtering of the bit-stream. The dithering technique results in a lower signal-to-noise ratio but, however, the desired resolution of the sigma-delta modulator can be achieved regardless of the lower signal-to-noise ratio. Furthermore, the idle tones are suppressed and the undesired periodicity of the bit-stream is destroyed.

Figure 6:
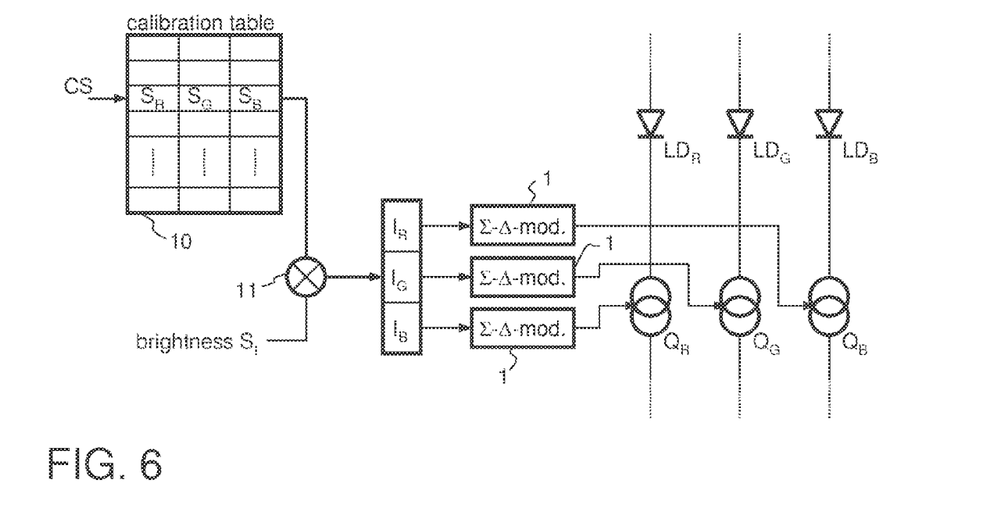
FIG. 6 is a block diagram of an LED driver circuit for driving multi-color LEDs with a sigma-delta modulator including three times the driver circuit of FIG. 3.

FIG. 6 illustrates, by means of a block diagram, an LED driver circuit for driving multi-color LEDs with a sigma-delta modulator 1, the LED driver circuit including three times the driver circuit of FIG. 3. Of course driver circuits with a sigma-delta modulator 1 having a second modulator connected downstream thereof as depicted in FIG. 4 are also applicable for building up a multi-color LED driver. In the present example one driver circuit according to FIG. 3 is employed for each color channel (red, green, and blue). Furthermore a dither noise may be added to the input signals $I_R$, $I_G$, $I_B$ of each color channel as discussed with reference to FIG. 5. Apart from the sigma-delta modulator 1 the further components of the multi-color LED driver circuit correspond to the components of the circuit discussed with reference to FIG. 1. Of course for less sophisticated applications, two channels with only two LEDs of different colors may be sufficient. In other applications even a fourth channel may be used including, for example, a white LED for additional brightness control.

Figure 7A:
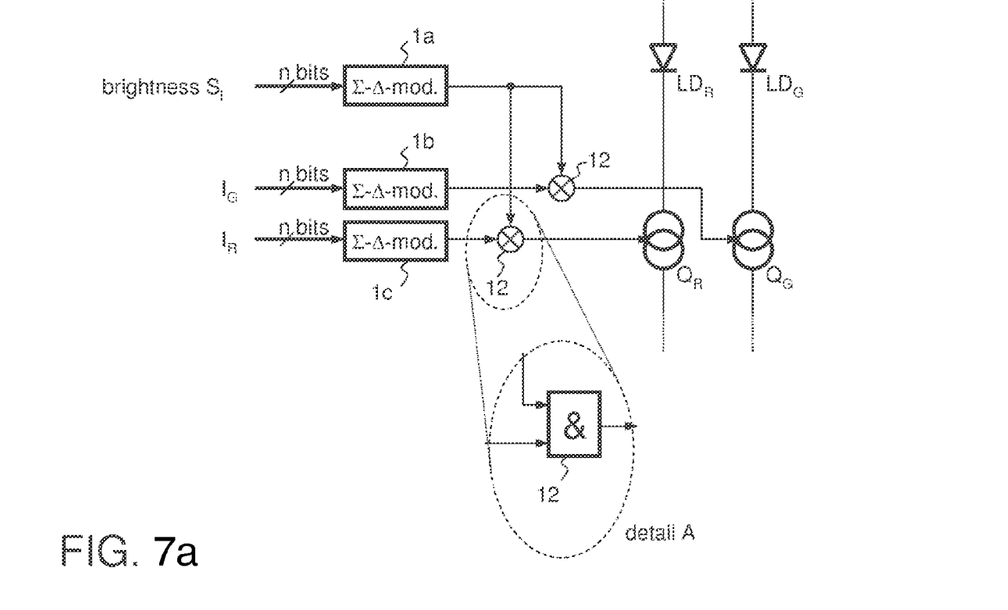
FIG. 7a is a block diagram of a circuit arrangement with two LEDs of different color and respective driver circuits for additive color mixing and brightness control.

FIG. 7a illustrates, by means of a block diagram, an alternative driver circuit for driving multi-color LEDs $LD_R$, $LD_G$ with sigma-delta modulators 1b, 1c. As in the example of FIG. 6 each of at least two LEDs $LD_R$ and $LD_G$ is connected with a respective controllable current source $Q_R$ and $Q_G$ such that the load currents of the light emitting diodes $LD_R$, $LD_G$ depend on respective control signals received by the current sources $Q_R$, $Q_G$. Examples for controllable current sources that may be employed for the present purpose are below with respect to FIGS. 9 and 10. The control signals by which the load current through the LEDs $LD_R$, $LD_G$ is set are bit-streams generated by sigma delta modulators 1b, 1c analogous to the example of FIG. 3. Each bit-streams depend on an input signals $I_R$, $I_G$ of the respective sigma-delta modulator 1c, 1b, whereby the mean value of each bit-stream corresponds to the value of the respective input signal $I_R$, $I_G$ as already explained above. The value of the input signals may be obtained from a calibration table as illustrated with respect to FIGS. 1 and 6. Different from the example of FIG. 6 the present example employs a different way of brightness control. A further sigma delta modulator 1a is supplied with brightness signal $S_I$ specifying a desired overall brightness of the LEDs present in the circuit arrangement. The analog or digital brightness signal $S_I$ is thus transformed into a bit-stream, too, whose mean value represents the desired brightness. The bit-streams generated by the other modulators 1b, 1c which define the effective color of the LEDs are multiplied (multiplication unit 12) with the brightness bit-stream for adjusting the brightness of the LEDs separately from the color. Compared to the example of FIG. 6 the multiplication of two bit-streams (e.g. output streams of modulators 1a and 1c or, respectively, modulators 1a and 1b) as shown in FIG. 7a may implemented by employing a simple AND-Gate (see FIG. 7a, magnified detail A) as multiplication unit 12, whereas an n-bit multiplier 11 as required in the example of FIG. 6 is much more complex to implement.

However, the implementation according to the example of FIG. 7a may produce unwanted artifacts, if the two bit-streams to be multiplied are strongly correlated which may be the case when idle-tones (see description of FIG. 5) occur. In order to overcome this problem, dither noise may be added to the input signals of the respective modulators (e.g., modulators 1a, 1b, 1c) as illustrated in FIG. 5. Another possibility is to place one of the two modulators whose output bit-streams are to be multiplied (e.g., modulator 1b and, respectively, modulator 1c) downstream of the AND-gate 12 as illustrated in FIGS. 7b and 7c.

Figure 7B:
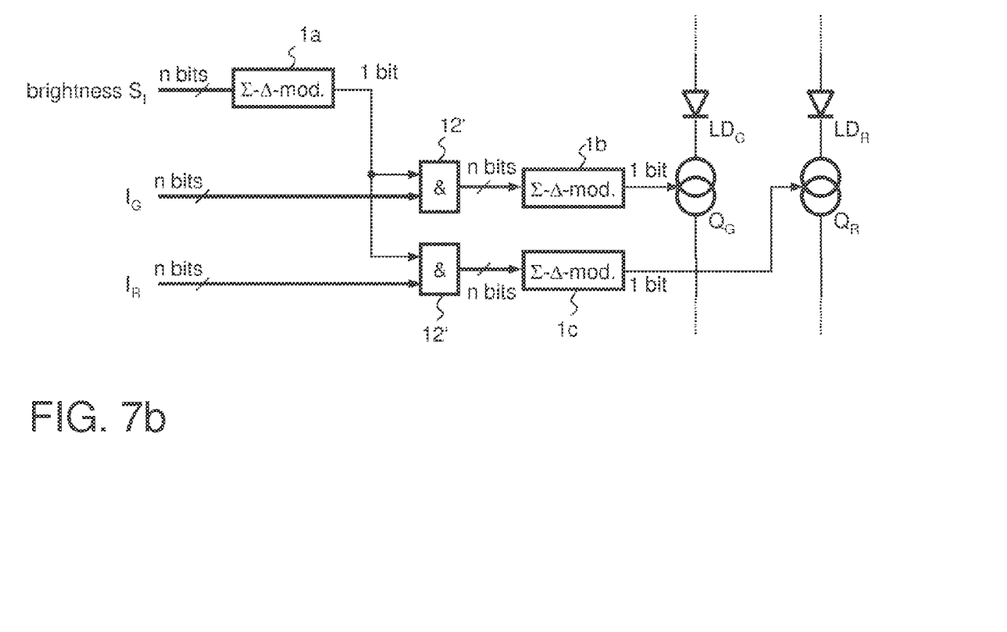

FIG. 7b illustrates the above-mentioned multiplication of brightness value $S_I$ with the color values $I_G$ and $I_R$ respectively. The ratio $I_G/I_R$ defines the effective color. Of course the arrangement of FIG. 7b can be extended by adding a third LED of a different color thus allowing for generation of an arbitrary color by additive color mixing. The brightness value $S_I$ and the color values $I_G$, and $I_R$ are multi bit words, e.g., words of 8 bits or 12 bits corresponding to binary number that represents a brightness or color value, respectively. Compared to FIG. 7a, in the arrangement of FIG. 7b the modulators 1b, 1c for modulating the n-bit color values $I_R$, $I_G$ are disposed downstream of the multiplier unit 12 (implemented as AND-gates). The m-bit brightness value $S_I$ is, however, modulated (modulator 1a) before multiplication. The multiplier unit 12' of FIG. 7b thus receives a serial stream of single bits representing the brightness, and (in each clock cycle) a color value $I_G$ (or $I_R$, respectively) represented by n (parallel) bits. The multiplication yields, as a result, a stream of n-bit words representing the desired value of the respective mean load current of the corresponding LED $LD_G$ (and $LD_R$, respectively). In each clock cycle the actual n-bit word of each stream (representing $I_G \cdot S_I$ and $I_R \cdot S_I$) of n-bit words is received by the further modulator 1b and 1c, respectively, that again modulates the n-bit word yielding a bit-stream of single bits. The resulting bit-streams are used to drive the respective controllable current source $Q_G$ and $Q_R$.

Figure 7C:
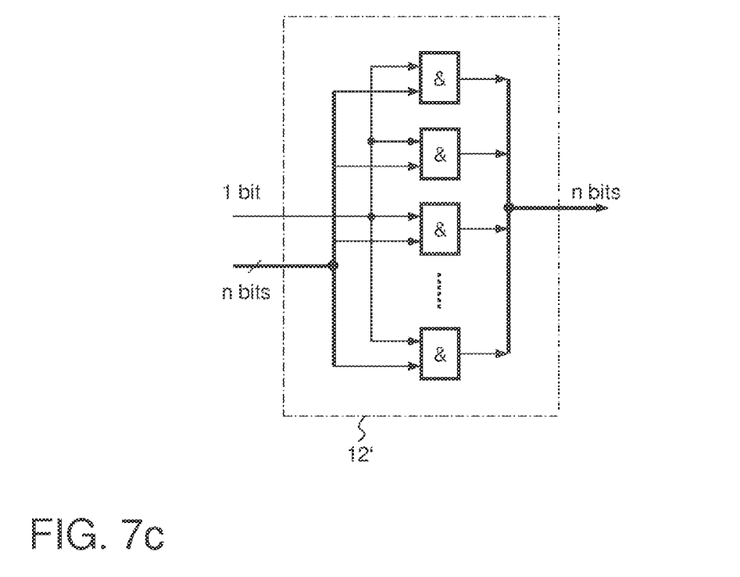
FIG. 7c illustrates a circuit detail of the circuit of FIG. 7b.

The implementation of the multiplier unit 12' is illustrated in FIG. 7c. The multiplier unit is implemented as an arrangement of a number of n AND-gates. Each single AND-gate receives the output bit-stream (1 bit each clock period) and one of the n bits of the n bit word ($I_G$ or $I_R$ in the example of FIG. 7b) representing the color. The n AND-combined output bits of the n AND gates are combined to form a n bit word at the output of the multiplier unit 12'.

Figure 8A:
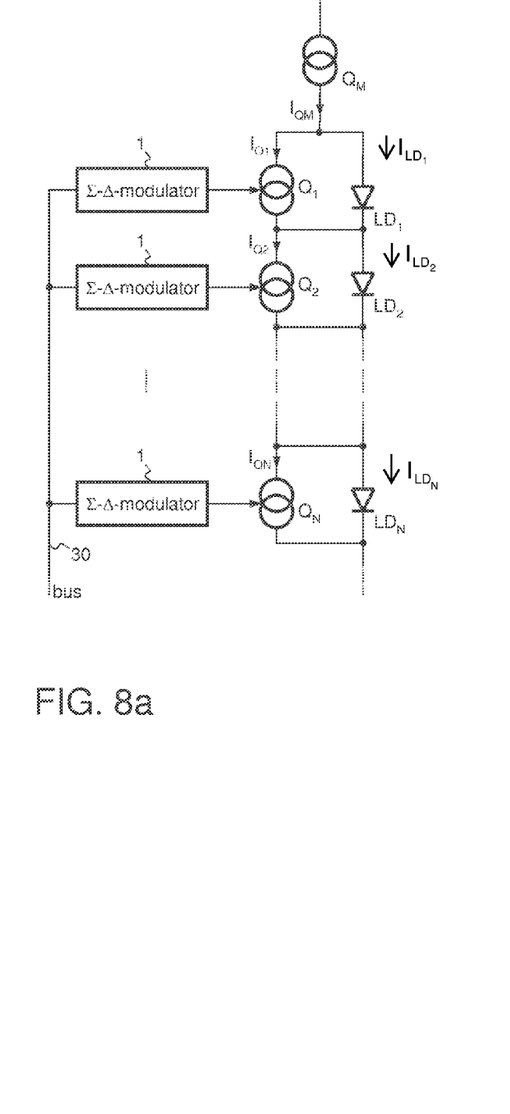
FIG. 8a is a block diagram of a further LED driver circuit, where the load current passing through an LED is controlled by means of a bypass current source.

FIG. 8a illustrates another driver circuit for driving a plurality of light emitting diodes $LD_1$, $LD_2$, ..., $LD_N$. However, The driver circuit of FIG. 8a may be employed for driving at least two light emitting diodes $LD_1$, $LD_2$. The driver circuit includes a main current source $Q_M$ providing a main current $I_{QM}$. A plurality of bypass current sources $Q_1$, $Q_2$ ..., $Q_N$ are connected in series to the main current source $Q_M$ and have terminals for connecting one light emitting diode $LD_1$, $LD_2$, $LD_N$ in parallel to each bypass current source $Q_1$, $Q_2$ ..., $Q_N$. Each bypass current source $Q_1$, $Q_2$ ..., $Q_N$ drives a bypass current $I_{Q1}$, $I_{Q2}$ ..., $I_{QN}$.

Each bypass current source $Q_1$, $Q_2$ ..., $Q_N$ and the respective light emitting diode $LD_1$, $LD_2$, $LD_N$ form a parallel circuit, wherein all these parallel circuits are connected in series.

A sigma-delta modulator 1 is connected to each bypass current source $Q_1$, $Q_2$ ..., $Q_N$ and configured to control the respective bypass current $I_{Q1}$, $I_{Q2}$ ..., $I_{QN}$ passing through the respective bypass current source $Q_1$, $Q_2$ ..., $Q_N$. As a result, the effective load current $I_{LD1}$, that passes through a certain light emitting diode $LD_1$ of the plurality of light emitting diodes, equals to the difference between the main current $k_m$ and the respective bypass current $I_{Q1}$, that is:

$$I_{LDi} = I_{QM} - I_{Qi},$$

whereby i is an index ranging from 1 to N denoting the number of the bypass current source $Q_i$ driving the bypass current $I_{Qi}$ and the light emitting diode $LD_i$ with the load current $I_{LDi}$.

Similar to the examples of FIGS. 3, 4, and 5 the brightness of each single LED $LD_i$ may be adjusted to a desired value by appropriately controlling the bypass currents $I_{Qi}$ and thus the load currents $I_{LDi}$ by means of the sigma-delta modulators 1.

Each sigma delta-modulator 1 may include a digitally addressable bus interface, for example, a serial bus interface for connecting a serial bus. The desired current or brightness value may be received from the bus 30 as a binary word. For multi-color illumination the brightness values may be taken from a calibration table as illustrated in the example of FIG. 1. Of course the sigma-delta modulators 1 of the present example may be followed by a second modulator 2, e.g., a pulse-width modulator, as discussed with reference to FIG. 4.

Figure 8B:
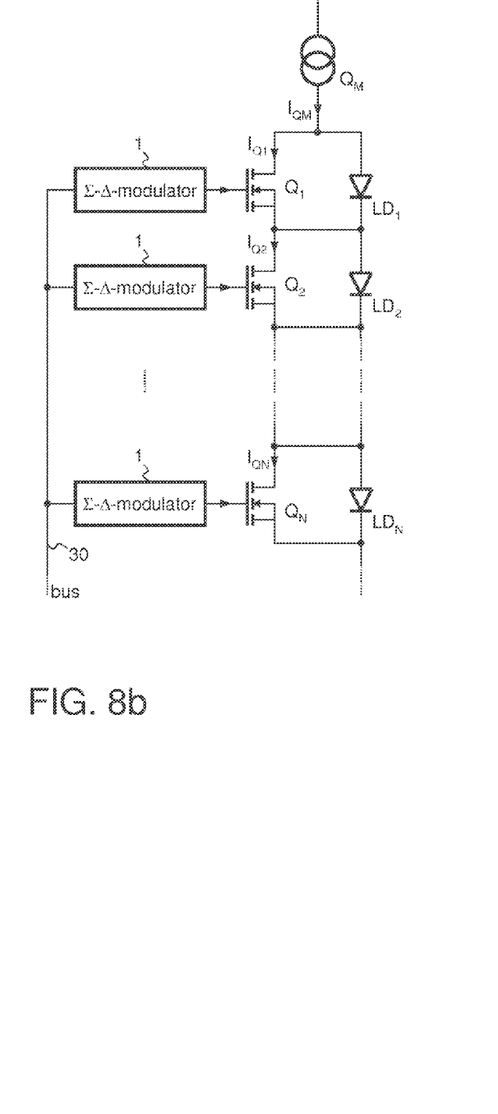
FIG. 8b is a block diagram of the LED driver of FIG. 8a where MOS transistors operate as switchable bypass current sources.

FIG. 8b illustrates an example similar to the example of FIG. 8a, where semiconductor switches, i.e., transistors, e.g., MOSFETs, are employed as bypass current sources $Q_i$. Except the bypass current sources of the example of FIG. 8b are identical to the example of FIG. 8a.

In multi-color applications, for example, an illumination device including a red LED $LD_1$, a green LED $LD_2$, and a blue LED $LD_3$, and a driver circuit as shown in FIGS. 8a and 8b, the color generated by mixing the light of the different LEDs may be adjusted by appropriately adjusting the brightness of each single LED $LD_1$, $LD_2$, $LD_3$ by means of the sigma-delta modulators 1. Additionally, the overall brightness may be adjusted by varying the main current $I_{QM}$. The main current source $Q_M$ may also be controlled by a sigma-delta modulator analogous to the bypass current sources $Q_1$ to $Q_N$.

Figure 9:
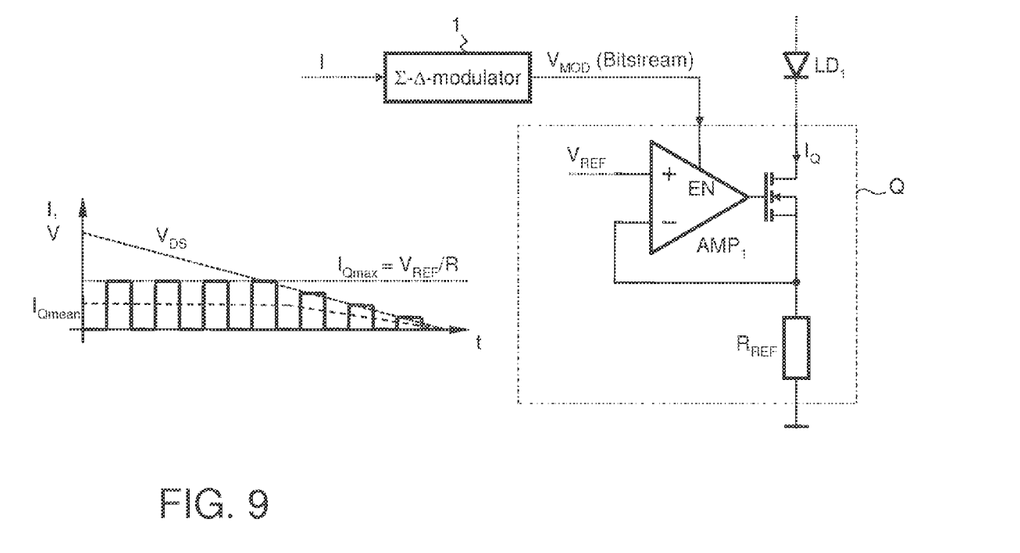
FIG. 9 is a block diagram illustrating the current source of the driver circuit of FIG. 3 in more detail.

FIG. 9 illustrates one exemplary embodiment of the controllable current source of FIG. 3 in more detail. As in the example of FIG. 3, a desired current value I (which might be a digital or an analog value) is supplied to an input of a sigma-delta-modulator 1 that provides a pulse-density modulated control signal $V_{MOD}$ at its output, wherein the mean value of the pulse-density modulated control signal $V_{MOD}$ equals the desired current value I. This pulse-density modulated control signal $V_{MOD}$ is supplied to a control input EN of the controllable current source Q that provides a pulse-density modulated current value $I_Q$ having a mean value $I_{Qmean}$ and a maximum value $I_{Qmax}$. During normal operation of the current source, the mean value $I_{Qmean}$ of the current $I_Q$ is directly proportional to the desired current value I, i.e., the mean current $I_{Qmean}$ of the current source can be set by means of the desired (analog or digital) current value I. The advantages of a pulse density controlled current source compared to known pulse-width modulated current sources have already been discussed above.

However, an implementation of current sources as illustrated in FIG. 3 or, in more detail, in FIG. 9 may have some shortcomings which become clear when looking at an actual implementation of the controllable current source as, for example, shown in FIG. 9. The output current $I_Q$ of the current source Q is provided by a transistor $T_1$; in the present example the output current is the drain current of a MOSFET. The maximum amplitude of the output current $I_{Qmax}$ is set by means of a reference voltage $V_{REF}$, a shunt resistor $R_{REF}$, and an amplifier $AMP_1$. The reference voltage $V_{REF}$ is provided to a first input of the amplifier $AMP_1$, which is, in the present example, an operational amplifier, and a feedback voltage $R_{REF} \cdot I_Q$ is supplied to a second input of the amplifier $AMP_1$. The shunt resistor $R_{REF}$ is connected in series to the transistor $T_1$ such that the output current $I_Q$ of the current source flows through the shunt resistor $R_{REF}$ and thus generates a voltage drop $R_{REF} \cdot I_Q$ across the shunt resistor proportional to the output current $I_Q$. The output of the amplifier $AMP_1$ is supplied to a control electrode of the transistor $T_1$ which is the gate electrode of the MOSFET in the present example. With the implementation of the current source Q of FIG. 9 the output current $I_Q$ is controlled to be proportional to the reference voltage $V_{REF}$, wherein, in the present example, the factor of proportionality is $1/R_{REF}$. In order to enable a modulation of the output current $I_Q$ the amplifier $AMP_1$ has a control input ("enable" input EN). The logic level of the pulse-density modulated control signal control signal $V_{MOD}$ enables (i.e., switches on) or disables (i.e., switches off) the controllable current source, such that the mean output current $I_{Qmean}$ corresponds to the desired current value I.

The above discussion concerning the function of the circuit of FIG. 9 did not consider the influence of the voltage drop across the load current path (i.e., the drain-source voltage $V_{DS}$) of the transistor $T_1$. As long as the voltage drop $V_{DS}$ across the transistor $T_1$ is above a certain threshold the transistor $T_1$ operates in its saturation region and its load current $I_Q$ (i.e., the output current of the current source Q) is independent from the voltage drop $V_{DS}$. But in an environment of varying supply voltages as, for example, in automotive applications, the voltage drop across the transistor may fall below the above mentioned threshold and the transistor $T_1$ starts to operate in its linear region which entails that the output current $I_Q$ is no longer independent from the voltage drop $V_{DS}$ but decreasing proportional with a decreasing voltage drop $V_{DS}$ across the load current path of the transistor $T_1$. As a consequence, the mean output current $I_{Qmean}$ is no longer proportional to the desired current value I as supplied to the input of the modulator 1, i.e., the mean value $I_{Qmean}$ of the output current of the current source Q is no longer controllable by the input I of the Σ-Δ-modulator 1, but dependent on external effects as might be, for example, a varying supply voltage provided by an automotive battery. This adverse effect can also be seen in the timing diagram on the left side of FIG. 9.

Figure 10:
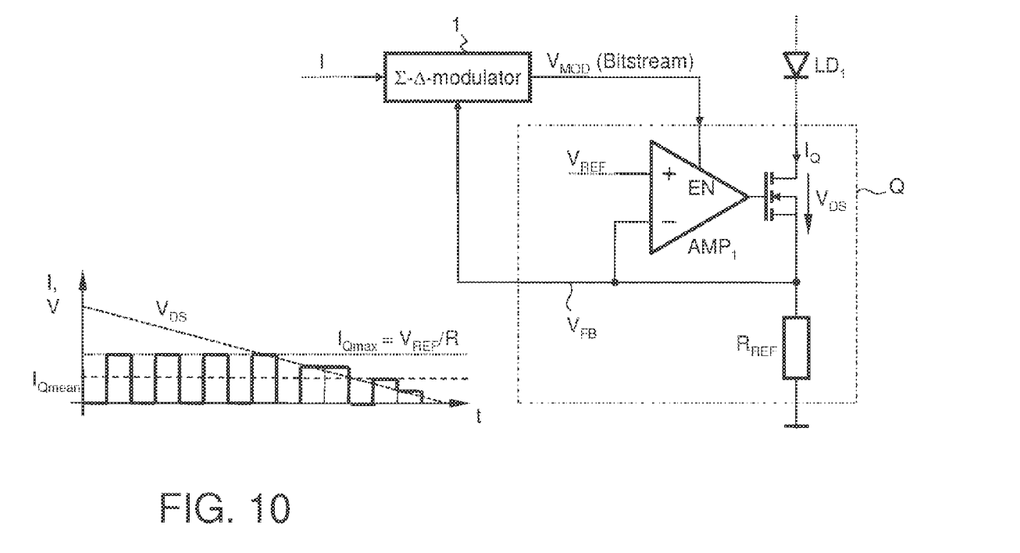
FIG. 10 is a block diagram illustrating a driver circuit similar to the circuit of FIG. 3 wherein the sigma-delta modulator receives an additional current feedback.

The above-described deficiency of the circuit of FIG. 9 can be overcome by the circuit of FIG. 10 illustrating one example of the present invention. The circuit of FIG. 10 is essentially the same as the circuit of FIG. 9 except an additional feedback loop. According to the present example a feedback signal ($I_Q \cdot R_{REF}$) that represents the output current of the current source is fed back to the modulator 1. If the mean output current $I_{Qmean}$ of the current source Q changes due to undesired external effects, the modulator 1 adjusts its modulated control signal $V_{MOD}$ for controlling the current source Q such that the mean output current $I_{Qmean}$ remains stable at its desired valued which is set by the value of the input signal I of the modulator 1. Due to the additional feedback loop the adverse external effects may be compensated for. In the present example, the pulse density of the PDM control signal provided by the modulator 1 and supplied to the current source Q is increased if the mean output current $I_{Qmean}$ of the current source Q decreases due to a decreasing voltage drop $V_{DS}$ across the load current path of the transistor $T_1$. The effect of a low drain-source voltage $V_{DS}$ is thus compensated for. This effect of this exemplary embodiment of the invention can be seen by comparing the timing diagrams of FIGS. 9 and 10.

Figure 11:
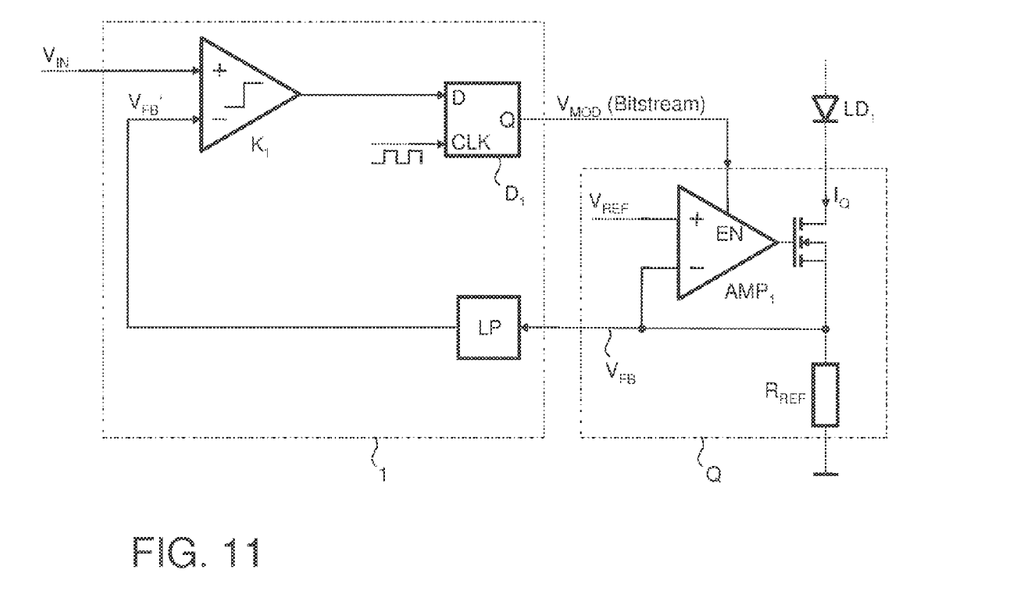
FIG. 11 is a block diagram illustrating one exemplary realization of the circuit of FIG. 10.

FIG. 11 illustrates another example of the invention. The circuit of FIG. 11 is an exemplary practical embodiment of the basic circuit of FIG. 10. In essence, an example of the modulator 1 of FIG. 10 is illustrated in more detail. The exemplary modulator 1 of FIG. 11 includes a comparator $K_1$, a latch $D_1$, and a low-pass filter LP. The comparator $K_1$ receives at its inputs an input signal $V_{IN}$ representing a desired mean current value (corresponds to symbol I in the example of FIG. 10) and a current feedback signal $V_{FB}'$ which is a low-pass filtered signal representing the mean output current $k_{mean}$ of the current source Q connected to the modulator 1 in the same way as in the example of FIG. 10. In the present embodiment the feedback signal $V_{FB}'$ is generated by low-pass filtering the voltage drop $V_{FB} = I_Q \cdot R_{REF}$ across the shunt resistor $R_{REF}$ of the current source Q. The cut-off frequency of the low-pass filter LP is chosen such that the output of the filter represents the mean value of its pulse-density modulated input signal. If the input signal $V_{IN}$ (representing the desired mean current) is greater than the feedback signal $V_{FB}'$ (representing the actual mean value of the output current $I_Q$) the comparator $K_1$ outputs a high level, and if the input signal $V_{IN}$ is lower than the feedback signal $V_{FB}'$ it outputs a low level. The comparator output is supplied to a data-input of the latch $D_1$, i.e., a D-latch in the present example. A clock signal is supplied to a clock input of the D-latch, and the output of the latch is connected to the control input EN of the current source Q, i.e., the latch provides as an output signal the pulse density modulated control signal $V_{MOD}$ for controlling the current source Q.

The example of FIG. 11 illustrates the function of the exemplary modulator 1 by means of a circuit diagram. It is evident that the same function may be also be implemented in a different way, for example, by means of a micro-controller or a digital signal processor. In such a digital implementation the voltage drop $I_Q \cdot R_{REF}$ would be digitized by means of an analog-to-digital converter and the low-pass filter LP might be implemented as a digital (FIR or IIR) filter. As an alternative, the sigma-delta modulator of FIG. 2 may be used instead the present modulator 1 which provides the same function.

The current sources of FIGS. 10 and 11 can usefully employed within the driver circuits for driving light emitting diodes as illustrated in FIGS. 3 to 6. Especially in multi-color LED applications, where the desired color is set by additive color mixing of red, green and blue light emitted by three different LEDs, a precise controllable mean load current $I_{Qmean}$ for the LEDs is useful for a precise setting of the color.

Although examples of the present invention have been described herein in detail, it is desired, to emphasis that this has been for the purpose of illustrating the present invention and should not be considered as necessarily limitative of the invention, it is being understood that many modifications and variations can be made by those skilled in the art while still practicing the invention claimed herein.

What is claimed is:

1. A circuit arrangement comprising
   a first light emitting diode and a second light emitting diode emitting light of different colors arranged adjacent to each other for additive color mixing;
   a first and a second controllable current source coupled to the first light emitting diode and a second light emitting diode, respectively, such that load currents of the first and second light emitting diodes depend on respective control signals received by the first and second current sources;
   a first and a second sigma-delta modulator coupled to the first light emitting diode and the second light emitting diode, respectively, and providing bit-streams as control signals to the first and second current sources, whereby a mean value of each bit-stream corresponds to a value of an input signal of the respective first or second sigma-delta modulator; and
   a further modulator receiving as an input signal a brightness signal whose value represents a desired brightness and generating a further bit-stream whose mean value represents the desired brightness.

2. The circuit arrangement of claim 1 further comprising
   a third light emitting diode arranged adjacent to the first and second light emitting diodes for additive color mixing;
   a third controllable current source connected to the third light emitting diode such that a load current of the third light emitting diode depends on a third control signal received by the third current source; and
   a third sigma-delta modulator connected to the third light emitting diode and providing a third bit-stream as the third control signal to the third current source, whereby a mean value of the third bit-stream corresponds to a value of an input signal of the third sigma-delta modulator.

3. The circuit arrangement of claim 1, further comprising a memory comprising a look-up table for retrieving values of the input signals for the first and second sigma-delta modulators dependent on a color index representing a desired color.

4. The circuit arrangement of claim 1, further comprising a multiplier unit configured to multiply each input signal with a brightness value specifying a desired brightness.

5. The circuit arrangement of claim 1, wherein each bit-stream comprises a stream of bit-symbols of equal length, each bit-symbol representing either a binary symbol "1" or "0".

6. A circuit arrangement comprising
a first light emitting diode and a second light emitting diode emitting light of different colors arranged adjacent to each other for additive color mixing;
a first and a second controllable current source coupled to the first light emitting diode and a second light emitting diode, respectively, such that load currents of the first and second light emitting diodes depend on respective control signals received by the first and second current sources; and
a first and a second sigma-delta modulator coupled to the first light emitting diode and the second light emitting diode, respectively, and providing bit-streams as control signals to the first and second current sources, whereby a mean value of each bit-stream corresponds to a value of an input signal of the respective first or second sigma-delta modulator, wherein each sigma-delta modulator receives a feedback signal representing the load currents of the first and second current sources, and is adapted to modulate the bit-stream such that the respective load current remains in a fixed relation to the input signal of the first and second sigma-delta modulator.

7. A circuit arrangement comprising
a first light emitting diode and a second light emitting diode emitting light of different colors arranged adjacent to each other for additive color mixing;
a first and a second controllable current source coupled to the first light emitting diode and a second light emitting diode, respectively, such that load currents of the first and second light emitting diodes depend on respective control signals received by the first and second current sources; and
a first and a second sigma-delta modulator coupled to the first light emitting diode and the second light emitting diode, respectively, and providing bit-streams as control signals to the first and second current sources, whereby a mean value of each bit-stream corresponds to a value of an input signal of the respective first or second sigma-delta modulator, wherein each bit-stream comprises at least two parallel streams of bit symbols representing a stream of multi-bit words, and wherein at least one current source comprises a further modulator receiving the stream of multi-bit words and providing a corresponding modulated signal for controlling the load currents of the first and second current sources.

8. A method for driving a multi-color LED arrangement comprising at least a first and a second light emitting diode arranged adjacent to each other for additive color mixing, the method comprising:
providing a color signal for each light emitting diode, the color signals defining an effective color of the multi-color LED arrangement;
generating a bit-stream for each color signal such that a mean value of the bit-stream represents the respective color signal;
providing a load current to each light emitting diode depending on the respective bit-stream, such that a mean load current of each light emitting diode corresponds to the respective color signal;
generating a further bit-stream dependent on a brightness signal whose value represents a desired brightness, a mean value of the further bit-stream representing the desired brightness; and
multiplying the bit-streams representing the color signals with the further bit-stream representing the desired brightness.

9. The method of claim 8, wherein:
providing a load current to each light emitting diode further comprises generating a third load current using a third controllable current source connected to a third light emitting diode arranged adjacent to the first and second light emitting diodes for additive color mixing; and
generating the bit-stream to each color signal further comprises generating a third bit-stream using a third sigma-delta modulator connected to the third light emitting diode as a control signal to the third controllable current source.

10. The method of claim 8 further comprising retrieving values of the color signals from a look-up table dependent on a color index representing a desired color.

11. The method of claim 8, further comprising multiplying each color signal with a brightness value specifying a desired brightness.

12. The method of claim 8, wherein generating the bit-stream for each color signal further comprises generating the bit-stream for each color signal using a first and a second sigma-delta modulator connected to the first and the second light emitting diode, respectively.

13. The method of claim 8, wherein providing the load current to each light emitting diode further comprises providing the load current to the first and second light emitting diode via a first and a second controllable current source connected to the first and the second light emitting diode.

14. The method of claim 13, wherein generating the bit-stream for each color signal further comprises generating the bit-stream for each color signal using a first and a second sigma-delta modulator connected to the first and the second light emitting diode, respectively.

15. A circuit comprising:
a first light emitting diode of a first color;
a second light emitting diode of a second color arranged adjacent the first light emitting diode, the first color different than the second color such that a combination of the first and second colors is for additive color mixing;
a first controllable current source with an output coupled to the first light emitting diode;
a second controllable current source with an output coupled to the second light emitting diode;
a first sigma-delta modulator with an output coupled to an input of the first controllable current source; and
a second sigma-delta modulator with an output coupled to an input of the second first controllable current source, wherein the output of the first sigma-delta modulator is coupled to the input of the first controllable current source via a first additional modulator and wherein the output of the second sigma-delta modulator is coupled to the input of the second controllable current source through a second additional modulator.

16. The circuit of claim 15, further comprising a memory coupled to inputs of the first and second sigma-delta modulators.

17. The circuit of claim 16, further comprising a multiplier coupled between the memory and the inputs of the first and second sigma-delta modulators.

* * * * *

UNITED STATES PATENT AND TRADEMARK OFFICE
CERTIFICATE OF CORRECTION

PATENT NO. : 8,278,840 B2
APPLICATION NO. : 12/719655
DATED : October 2, 2012
INVENTOR(S) : Logiudice et al.

It is certified that error appears in the above-identified patent and that said Letters Patent is hereby corrected as shown below:

In Col. 12, line 54, claim 15, delete "first".

Signed and Sealed this
Nineteenth Day of March, 2013

Teresa Stanek Rea
*Acting Director of the United States Patent and Trademark Office*